July 24, 1962      J. F. LORD      3,046,546
RANGE ALERT SYSTEM
Filed Dec. 9, 1957
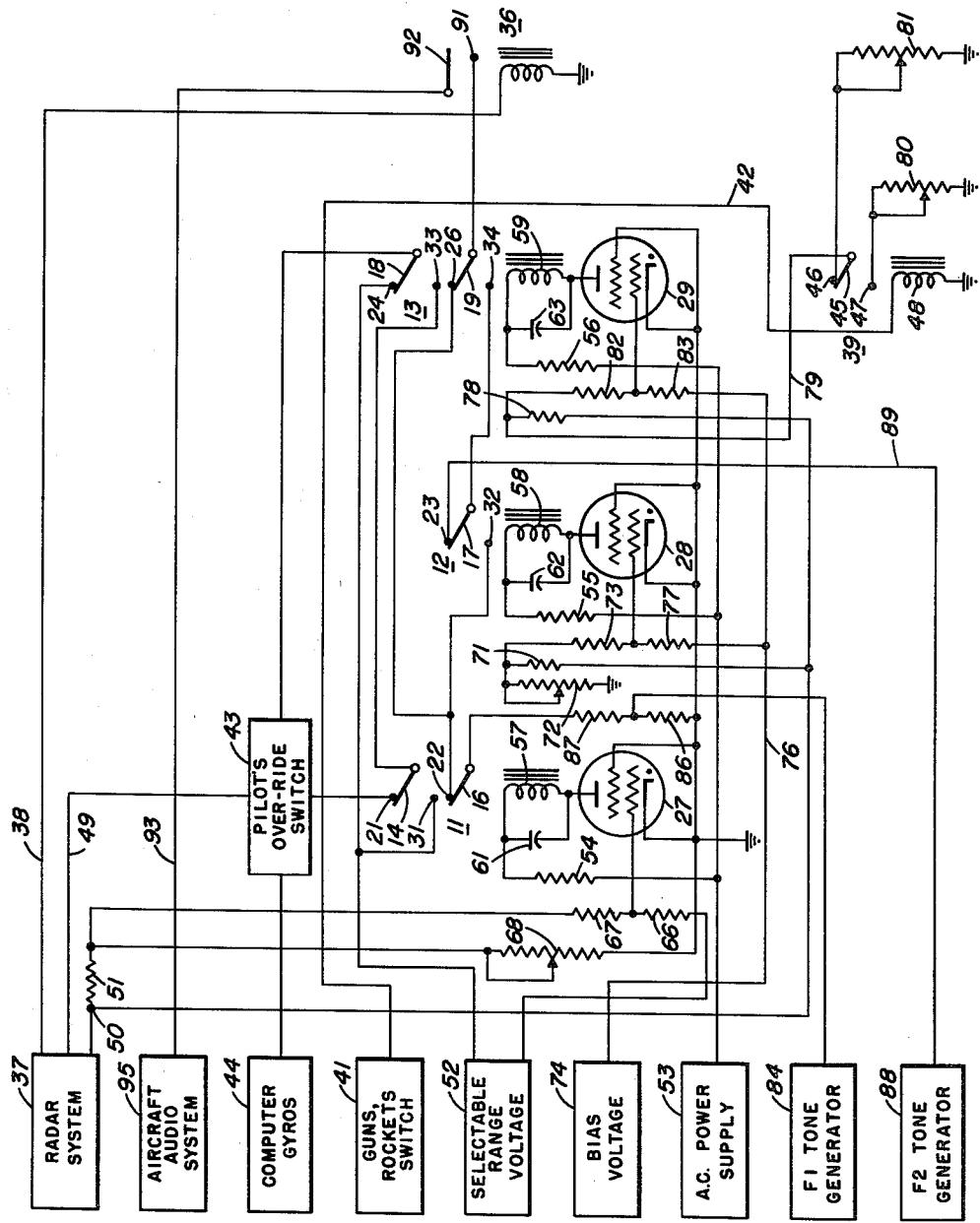
INVENTOR
JOHN F. LORD
BY
*R. J. Tompkins*
ATTORNEYS 3,046,546
RANGE ALERT SYSTEM
John F. Lord, Box 171, Lexington Park, Md.
Filed Dec. 9, 1957, Ser. No. 701,687
11 Claims. (Cl. 343—7)
(Granted under Title 35, U.S. Code (1952), sec. 266)

The invention described herein may be manufactured and used by or for the Government of the United States of America for governmental purposes without the payment of any royalties thereon or therefor.

The present invention relates to a range alert system and more particularly to a relay circuit adapted for use with airborne fire control radar systems to perform indicating and control functions in accordance with radar range.

While not restricted thereto, the invention is particularly adapted for use with airborne fire control systems and computers of the type wherein rate gyros are employed to sense the movements of the radar carrying aircraft (or the weapons platform in the case of turret systems).

In computers of the character described, the rate gyros are provided with damping windings which after radar lock-on are energized with a voltage proportional to range to provide range correlated tracking data. At extreme ranges the range voltage has insufficient magnitude to prevent gyro tumbling.

Circuitry is provided in the present invention which may be employed to apply an additional voltage to the gyro windings to maintain the gyros in a semi-caged condition until the range has decreased to a point where the range voltage has sufficient magnitude to permit removal of the caging voltage. At the breakaway point the circuitry of the present invention is operative to reapply the caging voltage to the gyros.

In addition to the above functions, the circuitry of the present invention may be employed to provide a sequence of audio tones to the aircraft's audio system to indicate: (1) the uncaged condition of the computer gyros, (2) the firing point, and (3) the breakaway point.

It is an object of the present invention to provide a range alert system.

It is a further and more specific object of the present invention to provide a relay circuit adapted for use with airborne fire control radar systems to perform indicating and control functions in accordance with radar range.

It is a further and still more specific object of the present invention to provide a relay circuit of the character described particularly adapted for use with airborne fire control computers employing rate gyro sensing units.

Other objects and many of the attendant advantages of this invention will be readily appreciated as the same becomes better understood by reference to the following detailed description when considered in connection with the accompanying drawing wherein:

The FIGURE is a circuit diagram of an illustrative embodiment of the present invention.

Referring now to the circuit diagram there is shown a plurality of relay means, here shown as three conventional relays generally indicated by the reference numerals 11, 12, and 13, which are connected in circuit with a plurality of electron discharge devices. As shown, relays 11, 12, and 13 are respectively connected in the anode circuits of three thyratrons 27, 28, and 29.

Relays 11, 12, and 13 have their movable contacts 14, 16, 17, 18, and 19 spring biased to engage back contacts 21, 22, 23, 24, and 26. When the thyratrons 27, 28, and 29 are conducting, movable contacts 14, 17, 18, and 19 are actuated to engage front contacts 31, 32, 33, and 34 while movable contact 16 is actuated to disengage back contact 22.

Movable contact 19 is coupled to the aircraft's audio system 95 through the contacts 91, 92 of an on-target relay 36, the operating winding of which is connected through a conductor 38 to be energized by a 28-volt D.C. potential from the lock-on circuits of radar system 37.

A pilot's override switch (which may be cockpit mounted) is provided and is operative in one position to connect back contact 21 through a conductor 49 to the range circuits of radar system 37 and movable contact 18 to computer gyros 44 and in another position to couple computer gyros 44 directly to radar system 37 to permit operation of the fire control system in the event of failure of the range alert system.

A guns-rocket relay 39, the purpose of which will be later described, includes a movable contact 45, stationary contacts 46, 47, and an operating winding 48 connected to a guns-rocket switch 41 which, like override switch 43, may be cockpit mounted.

The anodes of thyratrons 27, 28, 29 are respectively connected through the windings 57, 58, 59 of relays 11, 12, 13 and resistors 54, 55, 56 to an A.C. power supply 53. Relay windings 57, 58, 59 are provided with damping capacitors 61, 62, 63.

A direct voltage from selectable range voltage source 52 is coupled to back contact 24 and front contact 31 to provide the caging voltage for computer gyro 44 and is applied through resistors 66, 67, and potentiometer 68 to ground to provide a negative bias for thyratron 27.

A direct positive voltage which has a magnitude that diminishes with decrease in range is derived from the range circuits of radar system 37 and is applied from terminal 50 through resistor 51 and potentiometer 68 to ground. The portion of the direct range variable voltage appearing across potentiometer 68 is coupled through resistor 67 to the control grid of thyratron 27.

The magnitude of the selectable range voltage applied to thyratron 27 is selected in accordance with the range at which it is desired for the computer gyros to become uncaged.

Initially since the direct voltage proportional to range will exceed in magnitude the negative bias voltage, thyratron 27 will be conducting. Movable contact 14 will be actuated to engage front contact 31 and movable contact 16 will be separated from back contact 22. At some point, the variable range voltage from terminal 50 will diminish to the point where thyratron 27 will be biased to cut-off. At this time, movable contacts 14, 16 will be spring biased to engage back contacts 21, 22.

The range variable voltage from terminal 50 is applied through resistor 71 and potentiometer 72 to ground and coupled through resistor 73 as a signal voltage to the control grid of thyratron 28. A bias voltage source 74 is coupled through conductor 76, resistors 77, 73 and potentiometer 72 to ground to provide negative bias for thyratron 28. The negative bias voltage applied to thyratron 28 has a lower magnitude than the selectable range voltage applied to thyratron 27. Accordingly, thyratron 28 will become non-conducting after thyratron 27. When thyratron 28 becomes non-conducting, movable contact 17 will be spring biased to engage back contact 23.

The range variable direct voltage from terminal 50 is applied through resistor 78 and conductor 79 to movable contact 45 of relay 39 and then either through potentiometer 80 or 81 to ground depending upon the position of movable contact 45, and is coupled to the control grid of thyratron 29 through resistor 82. The negative bias voltage from bias voltage source 74 is applied through conductor 76, resistors 83, 82, 78, conductor 79 and either potentiometer 80 or 81 to ground as a negative bias to the control grid of thyratron 29. The parameters in the bias circuits for thyratron 29 are chosen so that thyratron 29 becomes non-conducting after thyratron 28. When thyratron 29 becomes non-conducting, movable contacts 18, 19 are spring biased to engage back contacts 24, 26.

An audio tone from tone generator 84 is coupled through a voltage divider comprising resistors 86, 87 to movable contact 16 of relay 11, while a second audio tone from tone generator 88 is coupled through a conductor 89 to back contact 23 of relay 12. Tone generator 84 may comprise a simple transformer energized by the aircraft's 400 cycle electrical system while tone generator 88 may comprise a simple bi-phase rectifier provided with appropriate filtering energized from an auxiliary winding on the transformer of tone generator 84. Alternatively, tone generators 84, 88 may comprise two audio oscillators or a single tunable oscillator.

In operation, when radar lock-on is obtained a 28 volt D.C. potential from radar system 37 is applied to on-target relay 36 which is energized to connect movable contact 19 of relay 13 through contacts 91, 92 of relay 36 and conductor 93 to the aircraft's audio system 95. At the same time other potentials are obtained from radar system 37 and the radar range voltage which will be applied directly to gyros 44 once they are uncaged is applied to conductor 49 and the range variable direct voltage is applied to terminal 50. Both the radar range voltage applied to conductor 49 and the range variable direct voltage applied to terminal 50 are voltages which vary with range, their utilization becoming apparent as the description progresses.

At this time, assuming that the range alert system has been energized, each of thyratrons 27, 28, 29 will become conducting actuating movable contacts 14, 17, 18, 19 to engage front contacts 31, 32, 33, 34 and movable contacts 16 to separate from back contact 22. With the circuit in this condition, a caging voltage from selectable range voltage source 52 will be applied through front contact 31, movable contact 14, front contact 33, movable contact 18, and the pilot's override switch 43 to the computer gyros 44 to maintain the gyros in a semi-caged condition.

When the radar range has decreased to some point determined by the selection of the magnitude of the voltage applied from source 52 to thyratron 27, thyratron 27 will become non-conducting and movable contacts 14, 16, of relay 11 will be spring biased to engage back contacts 21, 22. At this time, thyratrons 28, 29 will be still in a conducting condition. The separation of movable contact 14 from front contact 31 removes the caging voltage from the computer gyros. The radar range voltage is at this time coupled from the radar system through conductor 49, the pilot's override switch 43, back contact 21, movable contact 14, front contact 33, movable contact 18, and the pilot's override switch 43 to the computer gyros. At the same time an audio tone from tone generator 84 is coupled through movable contact 16, back contact 22, front contact 32, movable contact 17, front contact 34, movable contact 19, contacts 91, 92 of the on-target relay 36 and conductor 93 to the aircraft's audio system to indicate that the computer gyros have become uncaged.

When the firing point is reached, thyratron 28 will become deenergized and movable contact 17 of relay 12 will be spring biased to engage back contact 23. At this time, the first audio tone from tone generator 84 is removed from the aircraft's audio system by the separation of contacts 17, 32 and the second audio tone from tone generator 88 is coupled through conductor 89, back contact 23, movable contact 17, front contact 34, movable contact 19, contacts 91, 92 of on-target relay 36 and conductor 93 to the aircraft's audio system to indicate that the firing point has been reached.

At the breakaway point, determined by the selection of potentiometer 80 or 81, thyratron 29 will become deenergized causing movable contacts 18, 19 to be spring biased to engage back contacts 24, 26. The selection of potentiometer 80 or 81 depends upon the type of armament employed by the aircraft. For example, it may be desirable to breakaway at 400 yards if the aircraft is using rockets and at 200 yards if the aircraft is using guns. When thyratron 29 becomes deenergized, the second audio tone from tone generator 88 is removed from the aircraft's audio system by the separation of movable contact 19 from front contact 34. At this time the first audio from tone generaor 84 is coupled through movable contact 16, back contact 22, back contact 26, movable contact 19, contacts 91, 92 of on-target relay 36 and conductor 93 to the aircraft's audio system to indicate the breakaway point. At the same time, the caging voltage from selectable range voltage source 52 is applied through back contacts 24, movable contact 18, and pilot's override switch 43 to the computer gyros to prevent gyro tumbling during breakaway.

When breakaway has been completed, on-target relay 36 will become deenergized removing the audio tone from the aircraft's audio system. However, a caging voltage will continue to be applied to the computer gyros to prevent gyro tumbling until the gyros may be manually caged at which time the entire system may be deenergized by the actuation of some switching means not shown.

While the invention has been described in connection with particular application, thereof, many other applications of the invention are possible. For example, the invention may be utilized to operate equipment such as recorders, cameras, etc., in accordance with radar range and to indicate by means of audio tones the operation or non-operation of this equipment. Further, if desired, the audio portion of the system alone may be utilized.

Obviously many modifications and variations of the present invention are possible in the light of the above teachings. It is therefore to be understood that within the scope of the appended claims the invention may be practiced otherwise than as specifically described.

What is claimed is:

1. In combination: a radar system operative to provide a positive range variable voltage proportional to the distance of a target from the radar system, a plurality of electron discharge devices each having a control element, said electron discharge devices being in a conducting condition when the range variable voltage exceeds a predetermined value, a plurality of sources to provide negative voltages of different magnitudes, circuit means respectively coupling said plurality of negative voltage sources to the control elements of said electron discharge devices, circuit means simultaneously coupling said positive range variable voltage to the control elements of said electron discharge devices so that the electron discharge devices sequentially become non-conducting when the positive range voltage becomes smaller than the plurality of negative voltage sources, and a plurality of relay means respectively connected with said plurality of electron discharge devices to be sequentially deenergized upon the non-conduction of said electron discharge devices and in accordance with radar range.

2. In combination: a radar system operative to provide a positive range variable voltage, a plurality of electron discharge devices each having a control element, said electron discharge devices being in a conducting condition when the range variable voltage exceeds a predetermined value, a plurality of sources to provide negative voltages of different magnitudes, circuit means respectively coupling said plurality of negative voltage sources to the control elements of said electron discharge devices, circuit means simultaneously coupling said positive range variable voltage to the control elements of said electron discharge devices so that the electron discharge devices sequentially become non-conducting when the positive range voltage becomes smaller than the plurality of negative voltage sources, and a plurality of relay means respectively connected with said plurality of electron discharge devices to be sequentially deenergized upon the non-conduction of said electron discharge devices and in accordance with radar range, a plurality of means for generating a plurality of audio tones, an audio output circuit, and means activated by said plurality of relay means for selectively coupling said plurality of audio tone generating means to said audio output circuit.

3. A range alert system comprising: a radar system operative to provide a positive range variable voltage, a plurality of gas tubes, a plurality of relays having the operating windings thereof respectively connected in the anode circuits of said gas tubes, a plurality of sources to provide negative bias voltages of different magnitudes, circuit means respectively coupling the control grids of said gas tubes to said plurality of negative bias voltage sources, and circuit means simultaneously coupling said positive range variable voltage to the control grids of said gas tubes so that said gas tubes sequentially become non-conducting when the positive range voltage becomes smaller than the plurality of negative voltage sources, whereby said relays are sequentially deenergized in accordance with radar range.

4. A range alert system comprising: a radar system operative to provide a positive range variable voltage and a radar range voltage, a plurality of gas tubes, a plurality of relays having the operating windings thereof respectively connected in the anode circuits of said gas tubes, a plurality of sources to provide negative bias voltages of different magnitudes, circuit means respectively coupling the control grids of said gas tubes to said plurality of negative bias voltage sources, circuit means simultaneously coupling said positive range variable voltage to the control grids of said gas tubes so that said gas tubes sequentially become non-conducting when the positive range voltage becomes smaller than the plurality of negative voltage sources, whereby said relays are sequentially deenergized in accordance with radar range, computer means including rate gyro sensing means, a source of constant value voltage, and circuit means selectively coupling said computer to said radar range voltage or to said constant value voltage in accordance with the actuated condition of said plurality of relays.

5. A range alert system comprising: a radar system operative to provide a positive range variable voltage, a plurality of gas tubes, a plurality of relays having the operating windings thereof respectively connected in the anode circuits of said gas tubes, a plurality of sources to provide negative bias voltages of different magnitudes, circuit means respectively coupling the control grids of said gas tubes to said plurality of negative bias voltage sources, circuit means simultaneously coupling said positive range variable voltage to the control grids of said gas tubes so that said gas tubes sequentially become non-conducting when the positive range voltage becomes smaller than the plurality of negative voltage sources, whereby said relays are sequentially deenergized in accordance with radar range, a plurality of means for generating a plurality of audio tones, an audio output circuit, and means activated by said plurality of relay means for selectively coupling said plurality of audio tone generating means to said audio output circuit.

6. The combination of claim 5 wherein said radar system includes lock-on circuits and wherein there is further provided relay means energized from said lock-on circuits to disable said audio output circuit in the absence of radar lock-on.

7. A range alert system comprising: a radar system operative to provide a positive range variable voltage and a radar range voltage, a plurality of gas tubes, a plurality of relays having the operating windings thereof respectively connected in the anode circuits of said gas tubes, a plurality of sources to provide negative bias voltages of different magnitudes, circuit means respectively coupling the control grids of said gas tubes to said plurality of negative bias voltage sources, circuit means simultaneously coupling said positive range variable voltage to the control grids of said gas tubes so that said gas tubes sequentially become non-conducting when the positive range voltage becomes smaller than the plurality of negative voltage sources, whereby said relays are sequentially deenergized in accordance with radar range, computer means including rate gyro sensing means, a source of constant value voltage, circuit means selectively coupling said computer to said radar range voltage or to said constant value voltage in accordance with the actuated condition of said plurality of relays, a plurality of means for generating a plurality of audio tones, an audio output circuit, and means activated by said plurality of relay means for selectively coupling said plurality of audio tone generating means to said audio output circuit.

8. The combination of claim 7 wherein said radar system includes lock-on circuits and wherein there is further provided relay means energized from said lock-on circuits to disable said audio output circuit in the absence of radar lock-on.

9. The combination of claim 8 wherein there is further provided relay switching means operative to selectively vary the bias voltage applied to at least one of said gas tubes.

10. In combination, a radar system operative to provide a positive range variable voltage and a radar range voltage, both of said voltages being proportional to the distance of a target from the radar system, a plurality of electron discharge devices each having a control element, said electron discharge devices being in a conducting condition when the range variable voltage exceeds a predetermined value, a plurality of sources to provide negative voltages of different magnitudes, circuit means respectively coupling said plurality of negative voltage sources to the control elements of said electron discharge devices, circuit means simultaneously coupling said positive range variable voltage to the control elements of said electron discharge devices so that the electron discharge devices sequentially become non-conducting when the positive range variable voltage becomes smaller than the plurality of negative voltage sources, a plurality of relay means respectively connected with said plurality of electron discharge devices to be sequentially deenergized upon the non-conduction of said electron discharge devices and in accordance with radar range, computer means including rate gyro sensing means, a source of constant value voltage, and circuit means selectively coupling said computer to said radar range voltage or to said constant value voltage in accordance with the actuated condition of said plurality of relay means.

11. In combination, a radar system operative to provide a positive range variable voltage and a radar range voltage, a plurality of electron discharge devices each having a control element, said electron discharge devices being in a conducting condition when the range variable voltage exceeds a predetermined value, a plurality of sources to provide negative voltages of different magnitudes, circuit means respectively coupling said plurality of negative voltage sources to the control elements of said electron discharge devices, circuit means simultaneously coupling said positive range variable voltage to the control elements of said electron discharge devices so that the electron discharge devices sequentially become non-conducting when the positive range variable voltage becomes smaller than the plurality of negative voltage sources, a plurality of relay means respectively connected with said plurality of electron discharge devices to be sequentially deenergized upon the non-conduction of said electron discharge devices and in accordance with radar range, computer means including rate gyro sensing means, a source of constant value voltage, circuit means selectively coupling said computer to said radar range voltage or to said constant value voltage in accordance wth the actuated condition of said plurality of relay means, a plurality of means for generating a plurality of audio tones, an audio output circuit, and means actuated by said plurality of relay means for selectively coupling said plurality of audio tone generating means to said audio output circuit.

References Cited in the file of this patent

UNITED STATES PATENTS

| | | |
|---|---|---|
| 2,703,399 | Williams | Mar. 1, 1955 |
| 2,742,639 | Moore | Apr. 17, 1956 |